(12) United States Patent
Qian et al.

(10) Patent No.: US 11,711,758 B2
(45) Date of Patent: *Jul. 25, 2023

(54) SYSTEMS AND METHODS FOR BANDWIDTH PART SELECTION INITIATED BY A USER EQUIPMENT

(71) Applicant: Verizon Patent and Licensing Inc., Basking Ridge, NJ (US)

(72) Inventors: Nanjun Qian, Princeton, NJ (US); Xin Wang, Morris Plains, NJ (US); Jun Yuan, Cranbury, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/301,556

(22) Filed: Apr. 7, 2021

(65) Prior Publication Data

US 2021/0227456 A1 Jul. 22, 2021

Related U.S. Application Data

(63) Continuation of application No. 16/259,604, filed on Jan. 28, 2019, now Pat. No. 10,986,566.

(51) Int. Cl.
| | | |
|---|---|---|
| *H04W 48/18* | (2009.01) | |
| *H04W 28/02* | (2009.01) | |
| *H04W 28/16* | (2009.01) | |
| *H04W 76/27* | (2018.01) | |
| *H04W 52/02* | (2009.01) | |
| *H04W 80/02* | (2009.01) | |
| *H04W 24/08* | (2009.01) | |

(52) U.S. Cl.
CPC ............ *H04W 48/18* (2013.01); *H04W 24/08* (2013.01); *H04W 28/0221* (2013.01); *H04W 28/16* (2013.01); *H04W 52/0261* (2013.01); *H04W 76/27* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 2002/0114334 | A1* | 8/2002 | Yang | H04L 12/2856 370/252 |
| 2002/0176369 | A1* | 11/2002 | Porikli | H04L 1/0001 370/252 |
| 2010/0002635 | A1* | 1/2010 | Eklund | H04L 47/70 370/329 |

(Continued)

*Primary Examiner* — Hassan A Phillips
*Assistant Examiner* — Gautam Sharma

(57) ABSTRACT

A user equipment transmits user equipment information, associated with a communication of the user equipment, to permit a base station to select a first bandwidth part, a second bandwidth part, or a third bandwidth part. The user equipment is configured to communicate by the first bandwidth part, the second bandwidth part, and the third bandwidth part. The user equipment receives, from the base station, an instruction to monitor the first bandwidth part, the second bandwidth part, or the third bandwidth part. The instruction is selected based on the user equipment information. The user equipment monitors, based on the instruction, the first bandwidth part, the second bandwidth part, or the third bandwidth part.

20 Claims, 7 Drawing Sheets

(56) References Cited

U.S. PATENT DOCUMENTS

| | | | |
|---|---|---|---|
| 2016/0050671 A1* | 2/2016 | Yu | H04W 76/20 |
| | | | 455/450 |
| 2017/0126305 A1* | 5/2017 | Viorel | H04W 28/20 |
| 2018/0160427 A1* | 6/2018 | Ravishankar | H04B 7/18532 |
| 2018/0279289 A1* | 9/2018 | Islam | H04W 72/0446 |
| 2018/0332604 A1* | 11/2018 | Lee | H04W 52/365 |
| 2018/0368107 A1* | 12/2018 | Babaei | H04L 1/1838 |
| 2018/0376414 A1* | 12/2018 | Zeng | H04W 48/18 |
| 2019/0229986 A1* | 7/2019 | Chen | H04L 5/0053 |
| 2019/0372853 A1* | 12/2019 | Bainbridge | H04L 49/354 |
| 2020/0059537 A1* | 2/2020 | Forsman | H04L 67/61 |

\* cited by examiner

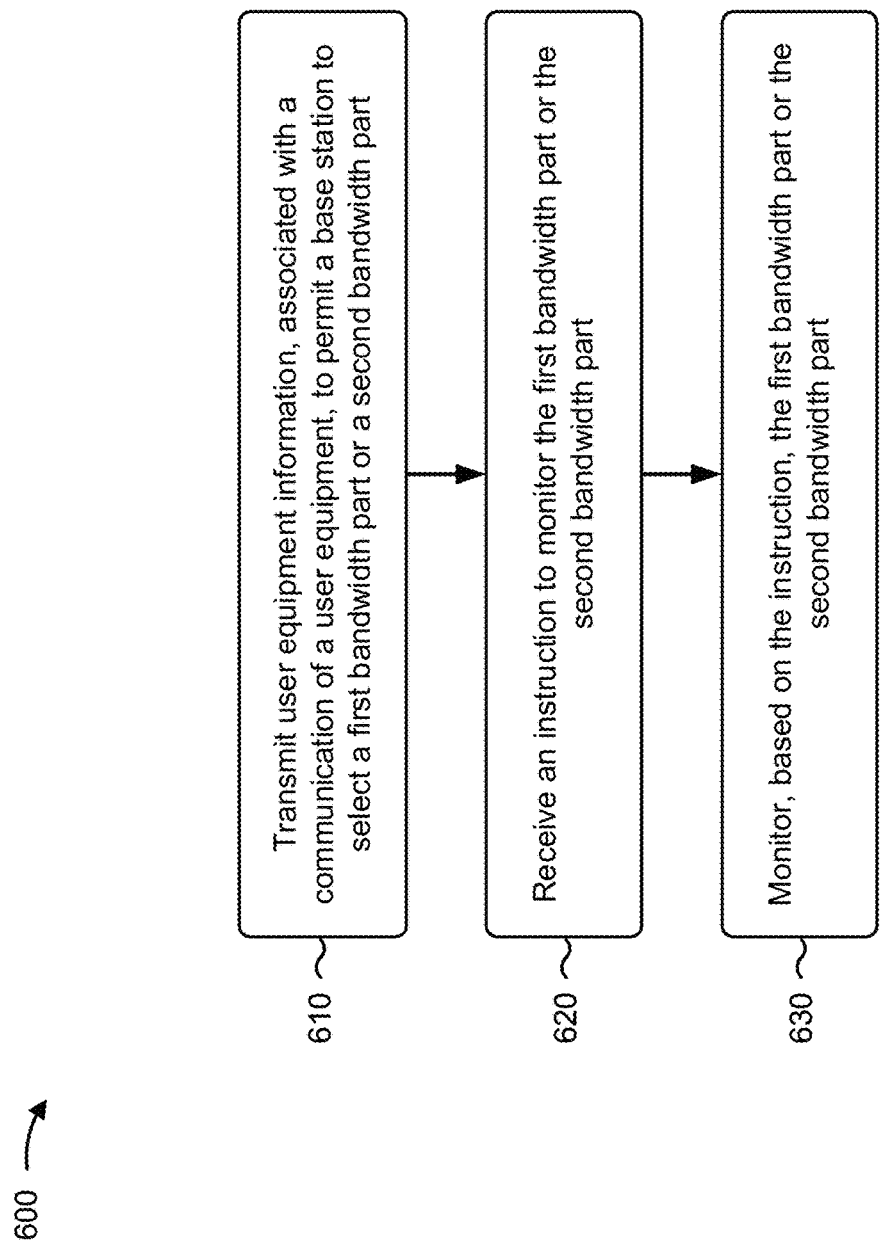

SYSTEMS AND METHODS FOR BANDWIDTH PART SELECTION INITIATED BY A USER EQUIPMENT

RELATED APPLICATION

This application is a continuation of U.S. patent application Ser. No. 16/259,604, entitled "SYSTEMS AND METHODS FOR BANDWIDTH PART SELECTION INITIATED BY A USER EQUIPMENT," filed Jan. 28, 2019 (now U.S. Pat. No. 10,986,566), which is incorporated herein by reference.

BACKGROUND

5G New Radio (NR) is a next generation air interface defined by The 3rd Generation Partnership Project (3GPP) for global wireless usage. 5G NR provides various enhancements to wireless communications, such as flexible bandwidth allocation, improved spectral efficiency, ultra-reliable low-latency communication (URLLC), beamforming, and high-frequency communication (e.g., millimeter wave (mmWave)).

BRIEF DESCRIPTION OF THE DRAWINGS

FIG. 6 is a flow chart of an example process for bandwidth part selection initiated by a user equipment.

DETAILED DESCRIPTION OF PREFERRED EMBODIMENTS

Figure 1:
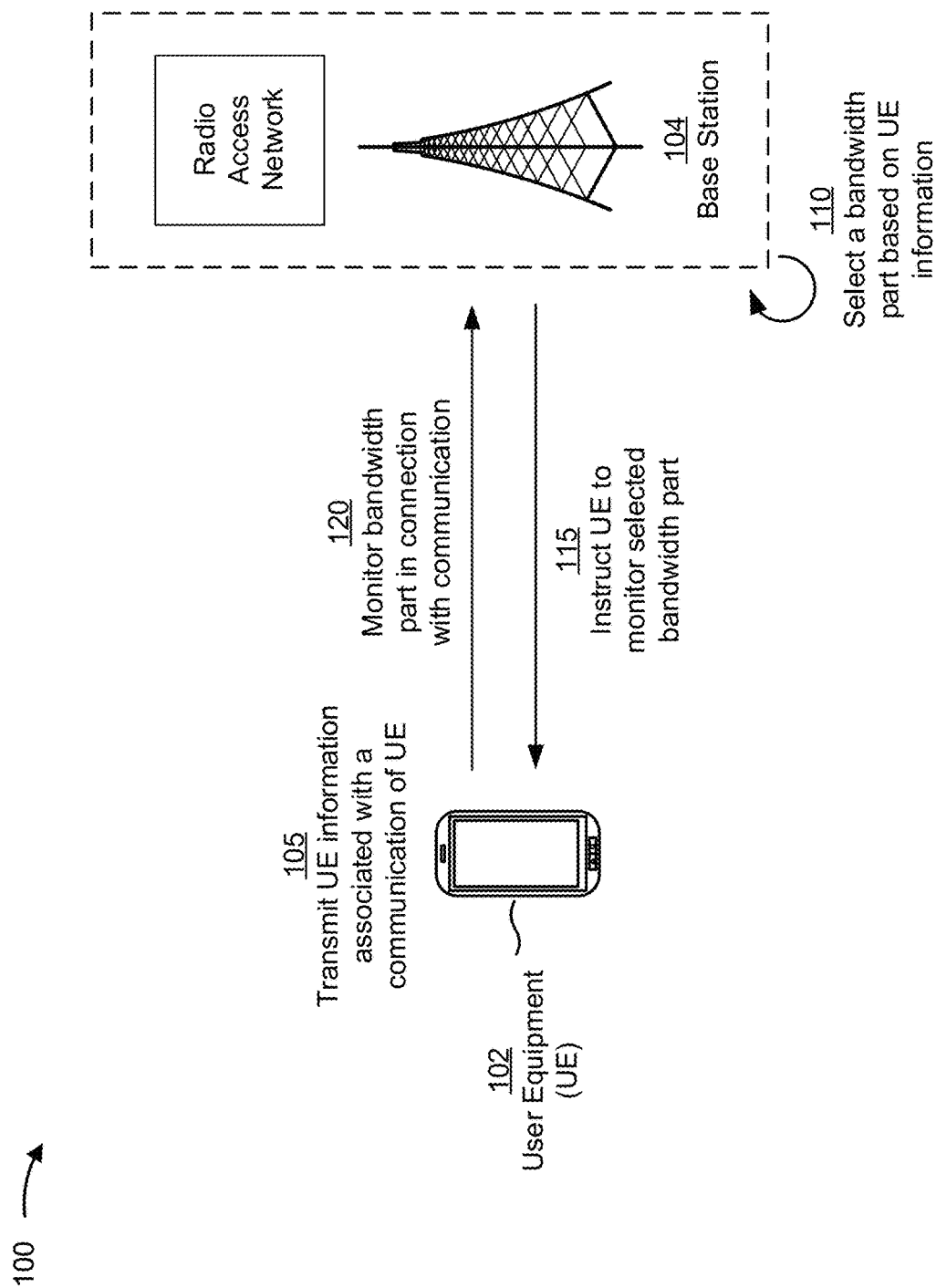
FIG. 1 is a diagram of an example implementation described herein.

The following detailed description of example implementations refers to the accompanying drawings. The same reference numbers in different drawings may identify the same or similar elements.

User equipment (UE) for wireless communication commonly employ mobile applications to accomplish various tasks, such as web browsing, video and music streaming, emailing, voice and video communication, messaging, gaming, remote interactions with devices (e.g., Internet of Things (IoT) devices), and/or the like. Mobile applications may produce large amounts of network traffic that can cause slower data transfer speed, latency, and connection failure due to the limited amount of bandwidth that is available on a network. 5G NR is expected to improve the speed, reliability, and latency of communications between UEs and network devices by offering a wider channel bandwidth compared to previous generation technologies.

In order to monitor the wide bandwidth of 5G NR, a UE consumes considerable power resources. However, a UE generally communicates little or no traffic for substantial periods of time (e.g., during periods where the UE is not in use, where the UE is sending and/or receiving simple text messages, etc.). Furthermore, many mobile applications communicate data in bursts that are followed by periods of little or no traffic (e.g., web browsing applications). Accordingly, communication via wide bandwidth may result in greater power consumption, battery drain, and thermal impact to a UE compared to previous generation technologies.

In some cases, a network may instruct a UE to monitor a subset of an overall carrier bandwidth. This subset may be referred to as a bandwidth part. The network may also instruct the UE to switch between two or more bandwidth parts according to the operational needs of the UE, which may be determined by the network by examining network buffer usage. As a result, when selecting bandwidth parts, the network may react to past operational needs of the UE rather than responding to prevailing or anticipated operational needs of the UE. Thus, current practices may result in an inefficient utilization of network resources and cause greater battery drain of UE.

Some implementations described herein include a UE that transmits UE information (e.g., information relating to an operation or a state of the UE) to a network to permit the network to select a bandwidth part for the UE. The network may instruct the UE to monitor the selected bandwidth part, and the UE may monitor the selected bandwidth part in connection with a communication of the UE. For example, the UE may transmit UE information relating to a current or future communication of the UE, and the network may respond by instructing the UE to monitor a particular bandwidth part based on the UE information. In this way, the selection and switching of bandwidth parts by the network is based on the prevailing needs or the anticipated needs of the UE, thereby resulting in a more efficient utilization of network resources, improved UE data transfer speeds and latency during periods of heavy traffic, and improved UE battery conservation during periods of little or no traffic.

FIG. 1 is a diagram of an example implementation 100 described herein. As shown in FIG. 1, example implementation 100 may include UE 102 that is wirelessly connected to a radio access network (RAN) via base station 104. UE 102 may be a communication and/or computing device, such as a mobile phone, a smartphone, a laptop computer, a tablet computer, an IoT device, and/or the like. In some implementations, UE 102 may be configured to execute one or more mobile applications (e.g., a virtual reality (VR) application, a streaming video application, a streaming music application, an email application, a gaming application, a text message application, etc.) that communicate data with a network via base station 104.

In some implementations, UE 102 may be configured to communicate by one or more bandwidth parts assigned to UE 102 (e.g., UE 102 may be configured to communicate by the one or more bandwidth parts at network registration (also referred to as network attachment), such as by radio resource control (RRC) signaling). In some implementations, a bandwidth part may be equal to a maximum bandwidth over which UE 102 is capable of communicating or may be less than a maximum bandwidth over which UE 102 is capable of communicating. In addition, a first bandwidth part assigned to UE 102 may be different from a second bandwidth part assigned to UE 102. For example, a first bandwidth part assigned to UE 102 may be wider than a second bandwidth part assigned to UE 102. In this way, UE 102 may use a wider bandwidth part in connection with communications that have greater bandwidth needs and a narrower bandwidth part in connection with communications that have lesser bandwidth needs, thereby providing for an efficient utilization of network resources. For example, a first wider bandwidth part may be used by UE 102 during a data burst, and a second narrower bandwidth part may be used by UE 102 during a period of no data transfer (e.g., an idle period), thereby enabling greater throughput during the data burst while improving battery conservation during the period of no data transfer.

In some implementations, UE 102 may be configured to communicate by a first bandwidth part, a second bandwidth part, a third bandwidth part, and/or an Nth bandwidth part assigned to UE 102. Additionally, or alternatively, UE 102 may be configured to communicate by a first bandwidth part, a second bandwidth part, a third bandwidth part, and/or an Nth bandwidth part for uplink communications that are different from a first bandwidth part, a second bandwidth part, a third bandwidth part, and/or an Nth bandwidth part for which UE 102 is configured for downlink communications.

As shown in FIG. 1, UE 102 may transmit UE information (e.g., information relating to an operation of UE 102) associated with one or more communications of UE 102 to base station 104. In some implementations, base station 104 may select a particular bandwidth part, of the bandwidth parts assigned to UE 102, based on the UE information transmitted by UE 102, and instruct UE 102 to monitor the particular bandwidth part selected in connection with a communication of UE 102. Thus, UE 102 may provide UE information that base station 104 may use to select a bandwidth part for UE 102.

Base station 104 may include an access point of a RAN, such as a 5G next generation NodeB (gNodeB or gNB). While the description to follow will be described in terms of communications between UE 102 and base station 104, the description is not limited to this particular example. Implementations described herein also apply to communications between UE 102 and another network device associated with the network.

As shown in FIG. 1, and by reference number 105, UE 102 may transmit, to base station 104, UE information relating to an operation of UE 102, such as application information, power information, bandwidth information, and/or the like. In some implementations, the UE information is associated with a current communication or a future communication of UE 102. For example, UE 102 may transmit bandwidth information relating to a traffic flow of an application (e.g., a VR application, a streaming video application, a gaming application, etc.) executing on UE 102.

In some implementations, UE 102 may transmit UE information in response to a change in a state or operational needs (e.g., application needs, power needs, bandwidth needs, and/or the like) of UE 102. In some implementations, the change in the state or the operational needs of UE 102 may be a change relating to an initiation of an application on UE 102, a change relating to a termination of an application on UE 102, a change relating to a traffic flow of an application executing on UE 102, a change relating to a power level of UE 102, a change relating to a hardware setting or a software setting of UE 102, and/or the like. For example, UE 102 may transmit first UE information when an application is initiated on UE 102 and may transmit second UE information when the application is terminated on UE 102. As another example, UE 102 may transmit first UE information for a first communication of an application executing on UE 102 (e.g., a data burst) and may transmit second UE information for a second communication of an application executing on UE 102 (e.g., a period of no data transfer, such as an idle period). As an additional example, UE 102 may transmit UE information when a battery level of UE 102 is below a threshold value (e.g., a low battery threshold setting of UE 102). As a further example, UE 102 may transmit UE information when a setting or a state of UE 102 is activated or entered (e.g., a battery saving setting, a data saving setting, a speed boost setting, a low battery state, an overheated state, a memory shortage state, a computing power shortage state, an exceeded data quota state, and/or the like). In this way, the UE information permits base station 104 to select a bandwidth part for UE 102 based on prevailing operational needs of UE 102, thereby utilizing network resources more efficiently by providing greater throughput when indicated by the operational needs of UE 102 and/or utilizing resources of UE 102 more efficiently by reducing power consumption, battery drain, and/or thermal impact when indicated by the operational needs of UE 102. In addition, bandwidth parts may be selected more efficiently based on UE information, thereby conserving computing resources (e.g., processing resources, memory resources, and/or the like) of the network that would otherwise be wasted by the network attempting to determine operational needs of UE 102.

In some implementations, the UE information may be information relating to one or more operations of UE 102, one or more communications of UE 102, one or more applications of UE 102, one or more settings of UE 102, and/or the like. For example, the UE information may be application information relating to one or more applications executing on UE 102, power information relating to one or more power consumptions of UE 102, bandwidth information relating to one or more traffic flows of UE 102, operational information relating to one or more operations or states of UE 102, and/or the like. In some implementations, the UE information may include a single one of application information, power information, bandwidth information, or operational information. In some implementations, the UE information may include at least one of, or at least two of, application information, power information, bandwidth information, or operational information. In some implementations, the UE information may include application information, power information, bandwidth information, and operational information.

In some implementations, application information may relate to a type of application (e.g., a VR application, a streaming video application, a streaming music application, an email application, a gaming application, a text message application, and/or the like), an initiation of the application (e.g., an indication that the application has been initiated on UE 102), a termination of the application (e.g., an indication that the application has been terminated on UE 102), and/or the like. In some implementations power information may relate to a battery saving power consumption of UE 102 (e.g., a power consumption associated with a battery saving setting of UE 102), an idling power consumption of UE 102 (e.g., a power consumption associated with no communication of applications executing on UE 102), an uplink power consumption of UE 102 (e.g., a power consumption associated with prevailing and/or anticipated communications from UE 102), a downlink power consumption of UE 102 (e.g., a power consumption associated with prevailing and/or anticipated communications to UE 102), and/or the like. In some implementations, bandwidth information may relate to a peak data rate of a traffic flow (e.g., a maximum data transfer rate achievable by UE 102, such as a data transfer rate associated with a data burst), an average data rate of a traffic flow (e.g., an average data transfer rate of UE 102, such as an average data transfer rate associated with a sustained data transfer to or from UE 102), a user-experienced data rate of a traffic flow (e.g., a minimum data transfer rate achievable by UE 102 on a network), a duration of a data burst traffic flow (e.g., a time interval over which a data burst of UE 102 occurs, a time interval over which a data burst of UE 102 is to occur, and/or the like), a bandwidth part indicator (e.g., an indicator of a bandwidth part that UE 102 is requesting, an indicator of a bandwidth part that UE 102 is using, and/or the like), and/or the like.

In some implementations, the UE information may include an expiration time, such as a time period for base station 104 to select a bandwidth part based on the UE information. For example, during the time period, base station 104 may use the UE information to select a bandwidth part, and after the time period, base station 104 may not use the UE information to select a bandwidth part, thereby reducing bandwidth part selections made according to UE information that may be irrelevant due to changing operational needs of UE 102.

In some implementations, the UE information may be a sequence (e.g., first UE information, second UE information, third UE information, etc.) or a pattern (e.g., alternating first UE information and second UE information) of UE information relating to anticipated operational needs of UE 102 (e.g., application needs, power needs, bandwidth needs, and/or the like). For example, UE 102 may transmit UE information that includes a repeating pattern of first UE information (e.g., first bandwidth information relating to a first traffic flow that occurs for 0.1 seconds) and second UE information (e.g., second bandwidth information relating to a second traffic flow after the first traffic flow that occurs for 10 seconds before returning to the first traffic flow) in anticipation of one or more communications of an application executing on UE 102. In this way, base station 104 may select bandwidth parts for UE 102 based on anticipated operational needs of UE 102, thereby conserving network resources and UE resources that would otherwise be wasted by repeatedly transmitting UE information to base station 104.

In some implementations, the sequence or pattern of UE information may include one or more transition conditions that provide criteria for anticipating a change in the operational needs of UE 102. In some implementations, a first transition condition may define a transition from a first communication to a second communication (e.g., a transition from a data burst to a period of no data transfer), and a second transition condition may define a transition from the second communication back to the first communication (e.g., a transition from the period of no data transfer to another data burst). Thus, for example, a pattern of UE information may include first UE information associated with a first communication, second UE information associated with a second communication, a first transition condition to transition from the first communication to the second communication, and a second transition condition to transition from the second communication back to the first communication.

In some implementations, the transition condition may be an expiration of a time interval associated with a communication (e.g., an expiration of 0.1 seconds, 1 second, 10 seconds, etc.). For example, if a streaming video application of UE 102 repeats a pattern of obtaining video content for a duration of 0.1 seconds, followed by 10 seconds of no data transfer, UE 102, or another device, may determine that a first transition condition associated with the pattern of the streaming video application is the expiration of 0.1 seconds and a second transition condition is the expiration of 10 seconds. Continuing with the previous example, a pattern of UE information for the streaming video application may include first UE information relating to a data burst (e.g., bandwidth information, such as a peak data rate associated with the data burst), second UE information relating to a period of no data transfer (e.g., bandwidth information, such as an average data rate associated with no data transfer), a transition condition to transition from the data burst to the period of no data transfer (e.g., an expiration of a first time interval, such as 0.1 seconds), and a second transition condition to transition from the period of no data transfer to another data burst (e.g., an expiration of a second time interval, such as 10 seconds).

In some implementations, a sequence or a pattern of UE information may include a termination condition that indicates an end of a data transfer or a communication session. For example, the termination condition may be an expiration of a time interval associated with a data transfer or communication session (e.g., 5 minutes, 10 minutes, 30 minutes, 1 hour, etc.).

In some implementations, UE 102 may determine one or more UE information (e.g., UE information or a sequence or a pattern of UE information that may include one or more transition conditions and/or termination conditions) based on characteristics of a data transfer, which may be obtained from a modem, or similar device, of UE 102, or may be defined by a codec associated with an application of UE 102. For example, UE 102 may determine UE information based on a file size or a file length of the data transfer, an object size or an object length of the data transfer, bandwidth information relating to the data transfer (e.g., peak data rate, average data rate, user-experienced data rate, etc.), and/or the like by calculating anticipated traffic flows according to the characteristics of the data transfer. In some implementations, such as where the UE information is a sequence or a pattern of UE information, the sequence or the pattern may be determined by historical UE information relating to a past communication involving a same or a similar application, a same or a similar file type, a same or a similar object type, a same or a similar traffic flow, etc. In some implementations, UE 102 may determine the UE information from an output of a machine learning model that was trained based on historical UE information relating to past communications. In some implementations, UE 102 may determine UE information from software settings or hardware settings of UE 102. For example, a battery monitoring application of UE 102 may provide power information relating to a power consumption of UE 102.

In some implementations, the UE information may be configured on UE 102 by an equipment manufacturer or a network that serves UE 102 (e.g., upon network registration (also referred to as attachment) of UE 102). For example, UE 102 may be configured with power information for different communication scenarios of UE 102 (e.g., UE 102 may be configured with first power information associated with a period of no data transfer and second power information associated with a period of data transfer). As another example, UE 102 may be configured with a sequence or a pattern of UE information that relates to traffic flows of a particular application present on UE 102 (e.g., UE 102 may be configured with a pattern of UE information relating to a manner in which a video streaming application consumes a file).

In some implementations, the UE information may be configured on UE 102 by a user of UE 102 through a settings interface. For example, the user may configure a first application type (e.g., an email application) to be associated with UE information indicating a low power consumption and a second application type (e.g., a streaming video application) to be associated with UE information indicating a high power consumption.

In some implementations, UE 102 may be configured with power information that relates to an application power consumption of UE 102. For example, UE 102 may be configured with power information that includes first power information (e.g., a first power profile) associated with a first application type (e.g., UE 102 may be configured with a low power consumption power profile that is associated with an email application) and second power information (e.g., a second power profile) associated with a second application type (e.g., UE 102 may be configured with a high power consumption power profile that is associated with a VR application). In some implementations, UE 102 may be configured with power information relating to a bandwidth power consumption of UE 102. For example, UE 102 may be configured with power information that includes first power information (e.g., a first power profile) associated with a first bandwidth need (e.g., UE 102 may be configured with a low power consumption power profile that is associated with a low throughput communication) and second power information (e.g., a second power profile) associated with a second bandwidth need (e.g., UE 102 may be configured with a high power consumption power profile that is associated with a high throughput communication).

In some implementations, UE 102 may transmit UE information to base station 104 by control information (e.g., uplink control information (UCI)), by a media access control (MAC) control element (CE), by RRC signaling, and/or the like. For example, UE 102 may transmit UE information to base station 104 via RRC signaling of one or more RRC information elements that may relate to one or more UE information, such as application information, power information, bandwidth information, and/or the like. As another example, UE 102 may transmit UE information to base station 104 via one or more MAC CE that may relate to one or more UE information, such as application information, power information, bandwidth information (e.g., a file or an object size, a file or an object length, and/or the like), and/or the like.

As shown by reference number 110, base station 104 may select a bandwidth part, of the bandwidth parts assigned to UE 102, in response to the UE information transmitted by UE 102. For example, if UE 102 transmitted UE information indicative of a heavy traffic flow, base station 104 may select a bandwidth part that is suitable for heavy traffic (e.g., a widest bandwidth part relative to the bandwidth parts assigned to UE 102), thereby improving throughput and reducing latency. As an additional example, if UE 102 transmitted UE information indicative of a period of no data transfer, base station 104 may select a bandwidth part that is suitable for a period of no data transfer (e.g., a narrowest bandwidth part relative to the bandwidth parts assigned to UE 102), thereby conserving battery resources of UE 102. In this way, base station 104 may select a bandwidth part for UE 102 in response to a change in the operational needs (e.g., application needs, power needs, bandwidth needs, and/or the like) of UE 102, thereby providing for bandwidth part switching that is closely tailored to the operational needs of UE 102 so that network resources and UE resources can be utilized efficiently.

Base station 104 may select a bandwidth part each time UE 102 transmits UE information to base station 104. Additionally, or alternatively, base station 104 may periodically select a bandwidth part based on a single transmission of UE information to base station 104 (e.g., where the UE information relates to a sequence or a pattern of UE information).

In some implementations, base station 104 may determine a bandwidth part by correlating the UE information to a bandwidth need of UE 102. For example, if the UE information includes application information, such as a type of application executing on UE 102, base station 104 may determine whether the type of application has a bandwidth need associated with a heavy traffic flow, a light traffic flow, a bursty traffic flow, a period of no traffic flow, and/or the like, and select a bandwidth part according to the determined bandwidth need. In some implementations, base station 104 may maintain an index that associates UE information, such as application types, with bandwidth needs that base station 104 may use to determine a bandwidth part. In some implementations, base station 104 may select a bandwidth part based on an output of a machine learning model that has been trained to select a bandwidth part based on UE information. This may be useful when there is a plurality of bandwidth parts from which to choose for UE 102 and/or when there is not an existing association of UE information to a particular bandwidth part.

In some implementations, such as where the UE information relates to a sequence or a pattern of UE information, base station 104 may select one or more bandwidth parts assigned to UE 102 based on the sequence or the pattern of UE information in the manner described above. For example, base station 104 may select a first bandwidth part based on first UE information of a sequence or a pattern of UE information, and base station 104 may select a second bandwidth part based on second UE information of the sequence or the pattern of UE information. In some implementations, base station 104 may select all bandwidth parts for a sequence or a pattern of UE information prior to transmitting an instruction to UE 102. For example, base station 104 may select a sequence or a pattern of bandwidth parts based on a sequence or a pattern of UE information prior to transmitting an instruction to UE 102. Additionally, or alternatively, base station 104 may select a single bandwidth part for a sequence or a pattern of UE information prior to transmitting an instruction to UE 102. For example, base station 104 may select a first bandwidth part for first UE information of a sequence or a pattern of UE information, transmit an instruction to UE 102 relating to the first bandwidth part, select a second bandwidth part for second UE information of the sequence or the pattern of UE information (e.g., after a transition condition of the sequence or the pattern is satisfied), transmit an instruction to UE 102 relating to the second bandwidth part, etc.

In some implementations, the one or more bandwidth parts selected by base station 104 may relate to one or more network slice instances. For example, a first bandwidth part may relate to a first network slice instance (e.g., a network slice instance associated with IoT applications) and a second bandwidth part may relate to a second network slice instance (e.g., a network slice instance associated with streaming video applications). In such implementations, base station 104 may select a bandwidth part associated with a particular network slice instance based on the UE information (e.g., application information, such as a type of application). In this way, communications of UE 102 may be transmitted or received via a network slice instance that is configured to the particular type of communication of UE 102, thereby further improving the efficiency by which network resources are utilized.

As shown by reference number 115, base station 104 may transmit one or more instructions to UE 102 that instruct UE 102 to monitor a particular bandwidth part according to the selection made by base station 104 based on the UE information. For example, base station 104 may instruct UE 102 to monitor a first bandwidth part, a second bandwidth part, a third bandwidth part, or a fourth bandwidth part based on the UE information.

Base station 104 may instruct UE 102 to monitor a selected bandwidth part each time UE 102 transmits UE information to base station 104. Additionally, or alternatively, base station 104 may periodically instruct UE 102 to monitor a selected bandwidth part based on a single transmission of UE information to base station 104 (e.g., where the UE information relates to a sequence or a pattern of UE information).

In some implementations, such as where the UE information relates to a sequence or a pattern of UE information, base station 104 may transmit an instruction to UE 102 after determining that a transition condition is satisfied. For example, base station 104 may transmit an instruction to UE 102 to switch from a first bandwidth part to a second bandwidth part after a transition condition associated with a transition from a first communication to a second communication is satisfied (e.g., an expiration of a time interval). In some implementations, UE 102 may determine whether the transition condition is satisfied and transmit a notification to base station 104 if the transition condition is satisfied.

In some implementations, base station 104 may transmit to UE 102 an instruction to monitor one or more bandwidth parts according to a sequence or a pattern of bandwidth parts that may include one or more transition conditions, and UE 102 may monitor the bandwidth parts according to the sequence or the pattern and one or more transition conditions without further instructions from base station 104. In this way, communications between UE 102 and base station 104 may be further reduced, thereby reducing network traffic and conserving network resources associated with multiple communications between UE 102 and base station 104.

In some implementations, base station 104 may transmit an instruction to UE 102 via control information (e.g., downlink control information (DCI)), via MAC CE, via RRC signaling, and/or the like, as described above.

As shown by reference number 120, UE 102 may monitor the bandwidth part instructed by base station 104 in connection with a communication of UE 102. In some implementations, UE 102 may transmit or receive a communication via the bandwidth part instructed by base station 104. For example, UE 102 may monitor a bandwidth part instructed by base station 104 to download a file or a portion of a file, send and/or receive an email, send and/or receive a text message, stream video content and/or music content, make and/or receive a voice call, and/or the like. In addition, UE 102 may monitor a bandwidth part instructed by base station 104 during a period of light traffic or no traffic to conserve battery usage of UE 102. In this way, UE 102 may monitor and communicate via a bandwidth part that is best suited to the needs of UE 102. In addition, because the bandwidth part selection is based on UE information provided by UE 102, rather than information gathered by the network, the bandwidth part selected is tailored to the prevailing or anticipated needs of UE 102, thereby conserving network resources and UE resources that would otherwise be wasted.

As indicated above, FIG. 1 is provided merely as an example. Other examples can differ from what was described with regard to FIG. 1. For example, in practice, the number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2A:
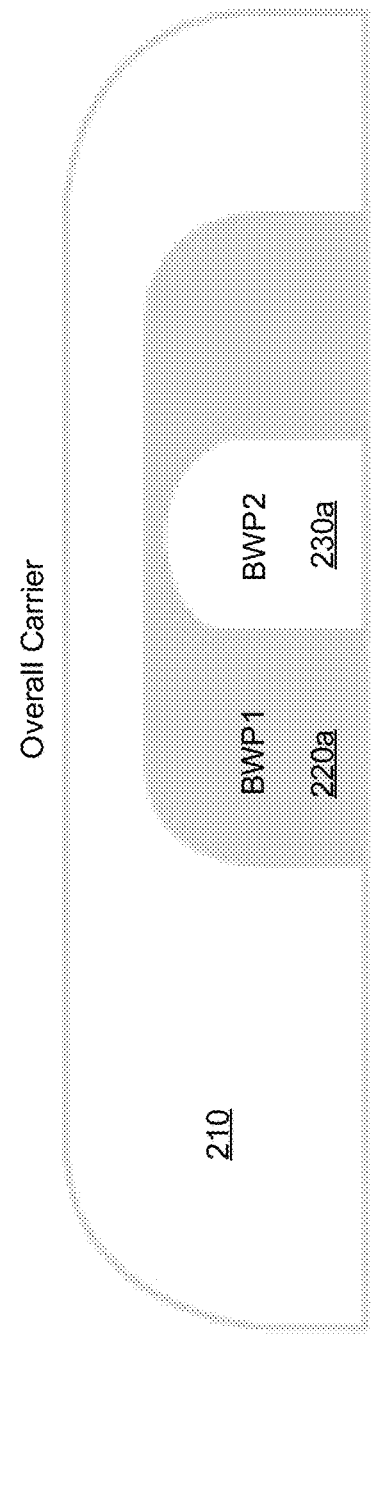
FIGS. 2A and 2B are diagrams of examples of a carrier partitioned into bandwidth parts.
Figure 2B:
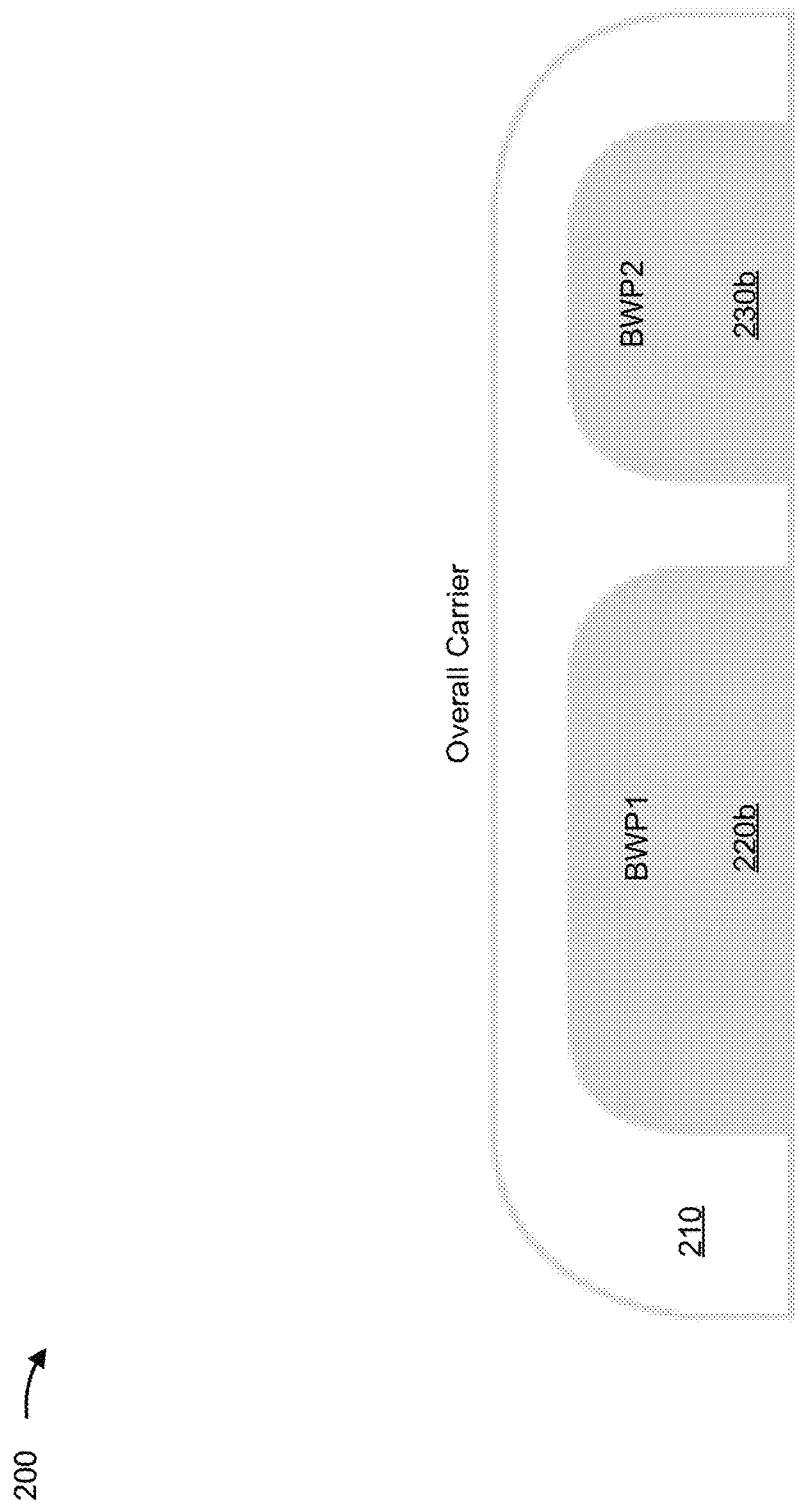

FIGS. 2A and 2B are diagrams of examples of a carrier partitioned into bandwidth parts. As shown in FIG. 2A, an overall carrier 210 may span a wide bandwidth, and a first bandwidth part (BWP1) 220*a* may be less than the overall carrier 210 bandwidth. In some implementations, a second bandwidth part (BWP2) 230*a* may span a portion of the first bandwidth part 220*a* (e.g., the second bandwidth part 230*a* may entirely overlap, or may partially overlap, with the first bandwidth part 220*a*). Thus, for example, a UE may monitor the first bandwidth part 220*a* when the UE is scheduled to transmit or receive data, and the UE may monitor the second bandwidth part 230*a* during a period of no data transfer (e.g., an idle period) to conserve battery power.

As shown in FIG. 2B, an overall carrier 210 may span a wide bandwidth that may be partitioned into multiple bandwidth parts, such as a first bandwidth part (BWP1) 220*b*, that spans a first portion of the overall carrier 210, and a second bandwidth part (BWP2) 230*b*, that spans a second portion of the overall carrier 210. In some implementations, different bandwidth parts may have different numerologies, such as about 15 kHz, 30 kHz, 60 kHz, 120 kHz, and/or the like (e.g., a subcarrier spacing of about 15 kHz or 30 kHz in sub-6 GHz carriers or a subcarrier spacing of about 60 kHz or 120 kHz in mmWave carriers).

As indicated above, FIGS. 2A and 2B are provided merely as examples. Other examples can differ from what was described with regard to FIGS. 2A and 2B.

Figure 3:
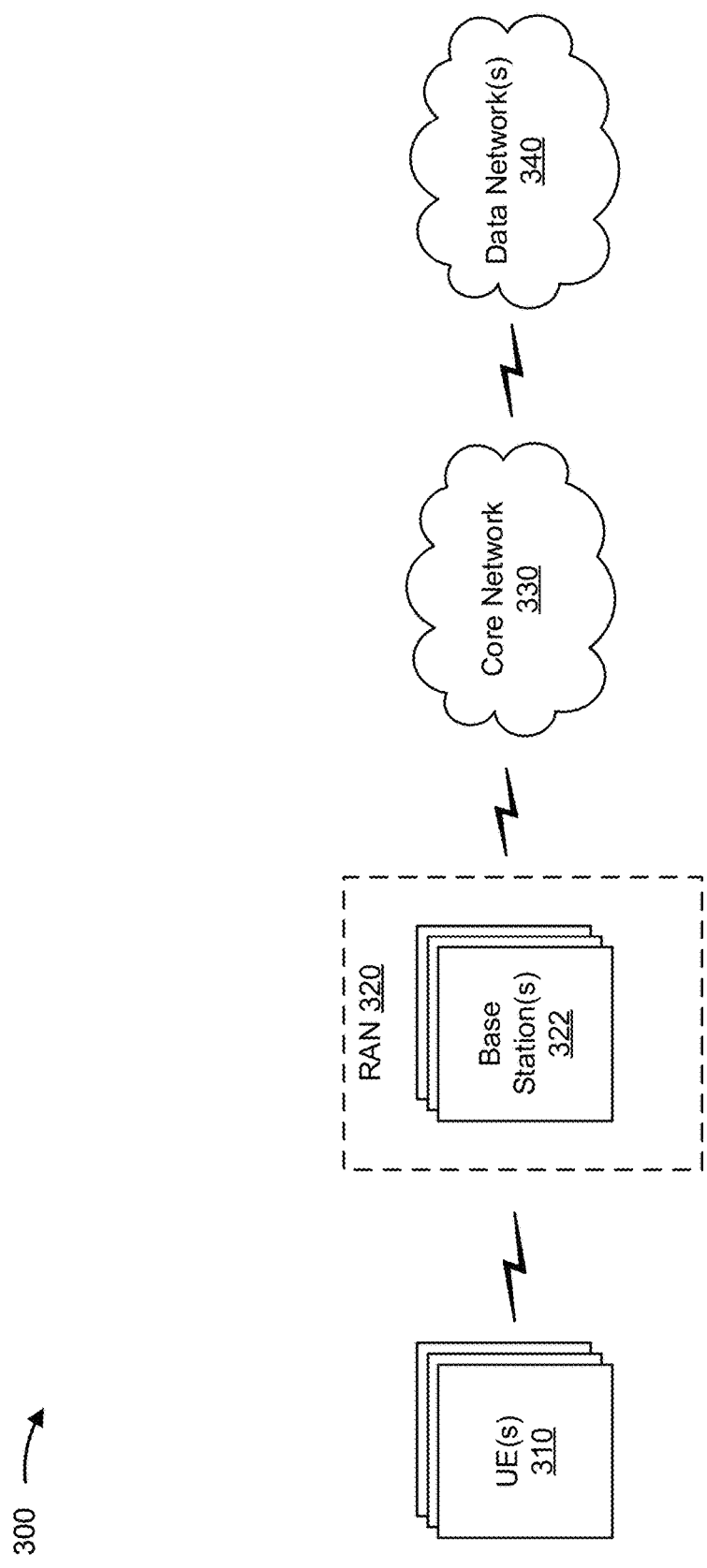
FIG. 3 is a diagram of an example environment in which systems, functional architectures, and/or methods, described herein, can be implemented.

FIG. 3 is a diagram of an example environment 300 in which systems and/or methods, described herein, may be implemented. As shown in FIG. 3, environment 300 may include a UE 310, a RAN 320, a core network 330, and a data network 340. Devices of environment 300 may interconnect via wired connections, wireless connections, or a combination of wired and wireless connections.

UE 310 includes one or more devices capable of communicating with RAN 320 and/or a data network 340 (e.g., via core network 330). For example, UE 310 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 310 may be capable of communicating using uplink (e.g., UE to RAN) communications, downlink (e.g., RAN to UE) communications, and/or sidelink (e.g., UE-to-UE) communications. In some implementations, UE 310 may include a machine-type communication (MTC) UE, such as an evolved or enhanced MTC (eMTC) UE. In some implementations, UE 310 may include an IoT UE, such as a narrowband IoT (NB-IoT) UE and/or the like.

RAN 320 includes one or more devices capable of communicating with UE 310 using a cellular radio access technology (RAT). For example, RAN 320 may include a base station 322, a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 322 has the same characteristics and functionality of RAN 320, and vice versa. RAN 320 may transfer traffic between UE 310 (e.g., using a cellular RAT), RANs 320 (e.g., using a wireless interface or a backhaul interface, such as a wired backhaul interface), and/or core network 330. RAN 320 may provide one or more cells that cover geographic areas. Some RANs 320 may be mobile base stations. Some RANs 320 may be capable of communicating using multiple RATs.

In some implementations, RAN 320 may perform scheduling and/or resource management for UEs 310 covered by RAN 320 (e.g., UEs 310 covered by a cell provided by RAN 320). In some implementations, RAN 320 may be controlled or coordinated by a network controller, which may perform load balancing, network-level configuration, and/or the like. The network controller may communicate with RAN 320 via a wireless or wireline backhaul. In some implementations, RAN 320 may include a network controller, a self-organizing network (SON) module or component, or a similar module or component. In other words, RAN 320 may perform network control, scheduling, and/or network management functions (e.g., for other RAN 320 and/or for uplink, downlink, and/or sidelink communications of UEs 310 covered by RAN 320). In some implementations, RAN 320 may apply network slice policies to perform the network control, scheduling, and/or network management functions. In some implementations, RAN 320 may include a central unit and multiple distributed units. The central unit may coordinate access control and communication with regard to the multiple distributed units. The multiple distributed units may provide UEs 310 and/or other RANs 320 with access to data network 340 via core network 330.

Core network 330 includes various types of core network architectures, such as a 5G Next Generation (NG) Core (e.g., core network 400 of FIG. 4), a Long-Term Evolution (LTE) Evolved Packet Core (EPC), and/or the like. In some implementations, core network 330 may be implemented on physical devices, such as a gateway, a mobility management entity, and/or the like. In some implementations, the hardware and/or software implementing core network 330 may be virtualized (e.g., through the use of network function virtualization and/or software-defined networking), thereby allowing for the use of composable infrastructure when implementing core network 330. In this way, networking, storage, and compute resources may be allocated to implement the functions of core network 330 (described with regard to FIG. 4) in a flexible manner as opposed to relying on dedicated hardware and software to implement these functions.

Data network 340 includes one or more wired and/or wireless data networks. For example, data network 340 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
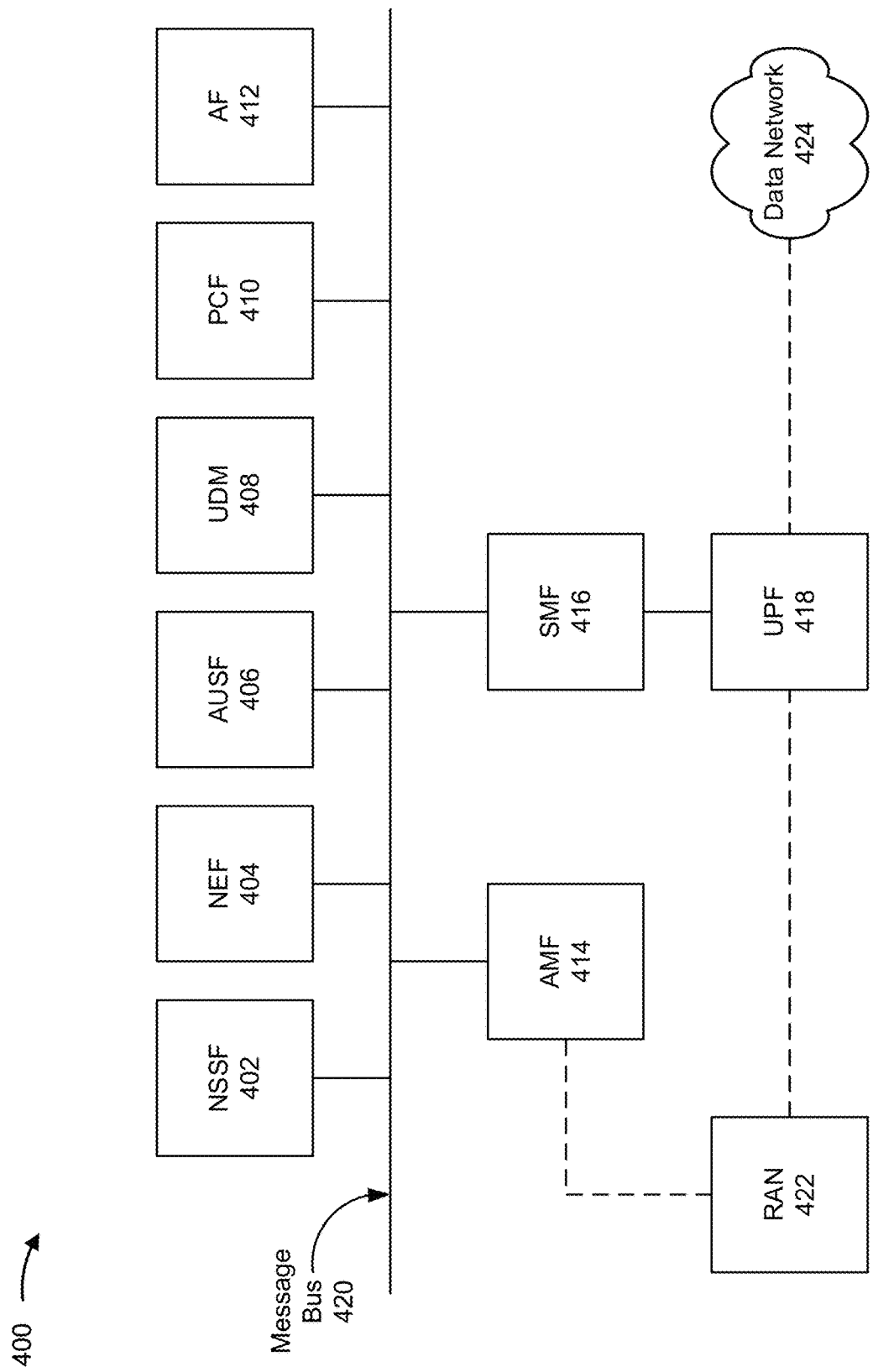
FIG. 4 is a diagram of an example functional architecture of an example core network described herein.

FIG. 4 is a diagram of an example functional architecture of a core network 400 in which systems and/or methods, described herein, may be implemented. For example, FIG. 4 may show an example functional architecture of a 5G NG core network included in a 5G wireless telecommunications system. In some implementations, the example functional architecture may be implemented by a core network (e.g., core network 330 of FIG. 3) and/or one or more of devices (e.g., a device described with respect to FIG. 5). While the example functional architecture of core network 400 shown in FIG. 4 may be an example of a service-based architecture, in some implementations, core network 400 may be implemented as a reference-point architecture.

As shown in FIG. 4, core network 400 may include a number of functional elements. The functional elements may include, for example, a Network Slice Selection Function (NSSF) 402, a Network Exposure Function (NEF) 404, an Authentication Server Function (AUSF) 406, a Unified Data Management (UDM) component 408, a Policy Control Function (PCF) 410, an Application Function (AF) 412, an Access and Mobility Management Function (AMF) 414, a Session Management Function (SMF) 416, and a User Plane Function (UPF) 418. These functional elements may be communicatively connected via a message bus 420, which may be comprised of one or more physical communication channels and/or one or more virtual communication channels. Each of the functional elements shown in FIG. 4 is implemented on one or more devices associated with a wireless telecommunications system. In some implementations, one or more of the functional elements may be implemented on physical devices, such as an access point, a base station, a gateway, a server, and/or the like. In some implementations, one or more of the functional elements may be implemented on one or more computing devices of a cloud computing environment associated with the wireless telecommunications system. In some implementations, the core network 400 may be operatively connected to a RAN 422, a data network 424, and/or the like, via wired and/or wireless connections with UPF 418.

NSSF 402 may select network slice instances for UEs, where NSSF 402 may determine a set of network slice policies to be applied at the RAN 422. By providing network slicing, NSSF 402 allows an operator to deploy multiple substantially independent end-to-end networks potentially with the same infrastructure. In some implementations, each slice may be customized for different services. NEF 404 may support the exposure of capabilities and/or events in the wireless telecommunications system to help other entities in the wireless telecommunications system discover network services and/or utilize network resources efficiently.

AUSF 406 may act as an authentication server and support the process of authenticating UEs in the wireless telecommunications system. UDM 408 may store subscriber data and profiles in the wireless telecommunications system. UDM 408 may be used for fixed access, mobile access, and/or the like, in core network 400. PCF 410 may provide a policy framework that incorporates network slicing, roaming, packet processing, mobility management, and/or the like.

AF 412 may determine whether UEs provide preferences for a set of network slice policies and support application influence on traffic routing, access to NEF 404, policy control, and/or the like. AMF 414 may provide authentication and authorization of UEs. SMF 416 may support the establishment, modification, and release of communications sessions in the wireless telecommunications system. For example, SMF 416 may configure traffic steering policies at UPF 418, enforce UE IP address allocation and policies, and/or the like. AMF 414 and SMF 416 may act as a termination point for Non-Access Stratum (NAS) signaling, mobility management, and/or the like. SMF 416 may act as a termination point for session management related to NAS. RAN 422 may send information (e.g. the information that identifies the UE) to AMF 414 and/or SMF 416 via PCF 410.

UPF 418 may serve as an anchor point for intra/inter RAT mobility. UPF 418 may apply rules to packets, such as rules pertaining to packet routing, traffic reporting, handling user plane Quality of Service (QoS), and/or the like. UPF 418 may determine an attribute of application-specific data that is communicated in a communications session. UPF 418 may receive information (e.g., the information that identifies the communications attribute of the application) from RAN 422 via SMF 416 or an Application Programming Interface (API). Message bus 420 represents a communication structure for communication among the functional elements. In other words, message bus 420 may permit communication between two or more functional elements. Message bus 420 may be a message bus, HTTP/2 proxy server, and/or the like.

RAN 422 may include a base station and be operatively connected, via a wired and/or wireless connection, to the core network 400 through UPF 418. RAN 422 may facilitate communications sessions between UEs and data network 424 by communicating application-specific data between RAN 422 and core network 400. Data network 424 may include various types of data networks, such as the Internet, a third-party services network, an operator services network, a private network, a wide area network, and/or the like.

The number and arrangement of functional elements shown in FIG. 4 are provided as an example. In practice, there may be additional functional elements, fewer functional elements, different functional elements, or differently arranged functional elements than those shown in FIG. 4. Furthermore, two or more functional elements shown in FIG. 4 may be implemented within a single device, or a single functional element shown in FIG. 4 may be implemented as multiple, distributed devices. Additionally, or alternatively, a set of functional elements (e.g., one or more functional elements) of core network 400 may perform one or more functions described as being performed by another set of functional elements of core network 400.

Figure 5:
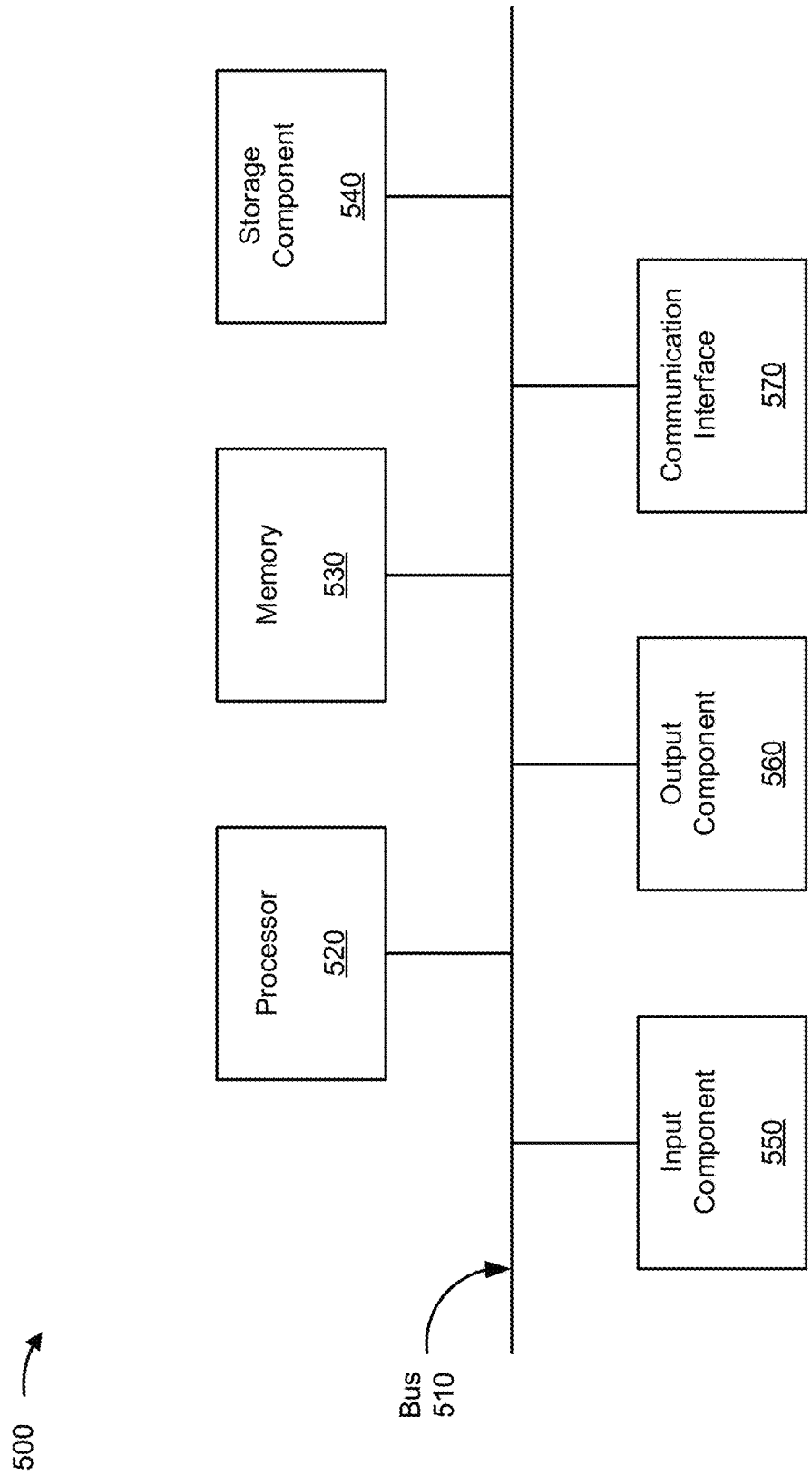
FIG. 5 is a diagram of example components of one or more devices of FIGS. 3 and 4.

FIG. 5 is a diagram of example components of a device 500. Device 500 can correspond to, or can implement, UE 310, a base station (e.g., base station 322) of RAN 320, one or more functional elements or devices of core network 330, one or more functional elements of core network 400, and/or a device of data network 340. In some implementations, UE 310, a base station (e.g., base station 322) of RAN 320, one or more functional elements or devices of core network 330, one or more functional elements of core network 400, and/or a device of data network 340 can include one or more devices 500 and/or one or more components of device 500. As shown in FIG. 5, device 500 can include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 can include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 can permit device 500 to receive information from another device and/or provide information to another device. For example, communication interface 570 can include an Ethernet interface, an optical interface, a coaxial interface, an infrared interface, a radio frequency (RF) interface, a universal serial bus (USB) interface, a wireless local area network interface, a cellular network interface, or the like.

Device 500 can perform one or more processes described herein. Device 500 can perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions can be read into memory 530 and/or storage component 540 from another computer-readable medium or from another device via communication interface 570. When executed, software instructions stored in memory 530 and/or storage component 540 can cause processor 520 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 can include additional components, fewer components, different components, or differently arranged components than those shown in FIG. 5. Additionally, or alternatively, a set of components (e.g., one or more components) of device 500 can perform one or more functions described as being performed by another set of components of device 500.

FIG. 6 is a flow chart of an example process 600 for bandwidth part selection initiated by a UE. In some implementations, one or more process blocks of FIG. 6 may be performed by a UE (e.g., UE 310). In some implementations, one or more process blocks of FIG. 6 may be performed by another device or a group of devices separate from or including UE 310, such as RAN 320, base station 322, and/or core network 330.

As shown in FIG. 6, process 600 may include transmitting UE information, associated with a communication of the UE, to permit a base station to select a first bandwidth part or a second bandwidth part (block 610). For example, the UE (e.g., using processor 520, memory 530, storage component 540, input component 550, communication interface 570, and/or the like) may transmit UE information, associated with a communication of the UE, to permit a base station to select a first bandwidth part or a second bandwidth part, as described above. The UE may be configured to communicate by the first bandwidth part and the second bandwidth part, prior to a communication session, by the base station, such as by RRC signaling.

In some implementations, the UE information includes at least one of, or at least two of, application information relating to an application executing on the UE, power information relating to a power consumption of the UE, or bandwidth information relating to a traffic flow associated with the UE. For example, the UE information may be application information that relates to one or more of a type of the application, an initiation of the application, or a termination of the application. As another example, the UE information may be power information that relates to one or more of a battery saving power consumption of the UE, an idling power consumption of the UE, an uplink power consumption of the UE, or a downlink power consumption of the UE. As an additional example, the UE information may be bandwidth information that relates to one or more of a peak data rate of the traffic flow, an average data rate of the traffic flow, a user-experienced data rate of the traffic flow, or a data burst duration of the traffic flow. In some implementations, the UE information includes the application information, the power information, and the bandwidth information. Additionally, the UE information may include a pattern of at least one of the application information, the power information, or the bandwidth information.

In some implementations, the UE information is transmitted via RRC signaling, such as by an information element, or via a MAC CE.

As further shown in FIG. 6, process 600 may include receiving an instruction to monitor the first bandwidth part or the second bandwidth part (block 620). For example, the UE (e.g., using processor 520, memory 530, storage component 540, input component 550, communication interface 570, and/or the like) may receive an instruction to monitor the first bandwidth part or the second bandwidth part, as described above. In some implementations, the instruction is selected (e.g., by the base station) based on the UE information.

In some implementations, the UE information may expire so that selecting the bandwidth part is not based on UE information that is irrelevant to current operational needs of the UE. For example, the UE information may be used to select the first bandwidth part or the second bandwidth part during a time period and may not to be used to select the first bandwidth part or the second bandwidth part after the time period.

Additionally, the first bandwidth part and the second bandwidth part may be associated with one or more network slice instances of a network. For example, the first bandwidth part may be associated with a first network slice instance of a network, and the second bandwidth part may be associated with a second network slice instance of the network.

As further shown in FIG. 6, process 600 may include monitoring, based on the instruction, the first bandwidth part or the second bandwidth part in connection with the communication of the UE (block 630). For example, the UE (e.g., using processor 520, memory 530, storage component 540, input component 550, communication interface 570, and/or the like) may monitor, based on the instruction, the first bandwidth part or the second bandwidth part in connection with the communication of the UE, as described above.

In some implementations, the first bandwidth part may be greater than the second bandwidth part and the instruction may be a first instruction to monitor the first bandwidth part (e.g., where the UE information is associated with an initiation of the communication of the UE). In such implementations, the UE may further transmit a notification of a termination of the communication, receive a second instruction to monitor the second bandwidth part, where the second instruction is selected based on the notification of the termination of the communication, and monitor, based on the second instruction, the second bandwidth part in connection with the termination of the communication of the UE. In this way, the UE may monitor the first bandwidth part or the second bandwidth part in response to a change in the operational needs of the UE (e.g., a first operational need associated with initiating the communication and a second operational need associated with terminating the communication), thereby providing for bandwidth part switching that is closely tailored to the operational needs of UE 102 so that network resources and UE resources can be utilized efficiently.

In some implementations, the UE information may include first UE information associated with a first communication of the UE (e.g., a data burst), second UE information associated with a second communication of the UE (e.g., an idle period), and a transition condition to transition from the first communication to the second communication (e.g., an expiration of a time interval). In such implementations, after receiving an instruction (e.g., a first instruction) to monitor the first bandwidth part or the second bandwidth part and monitoring, based on the instruction, the first bandwidth part or the second bandwidth part in connection with a communication (e.g., a first communication), the UE may further receive, after the transition condition is satisfied, a second instruction to monitor the first bandwidth part or the second bandwidth part, where the second instruction is selected based on the second UE information and is different from the first instruction. The UE may additionally monitor, based on the second instruction, the first bandwidth part or the second bandwidth part in connection with the second communication of the UE. In this way, the selection of bandwidth parts may be based on a sequence or a pattern of UE information, thereby reducing the number of communications between the UE and a base station and conserving network resources.

In some implementations, after receiving an instruction (e.g., a first instruction) to monitor the first bandwidth part or the second bandwidth part based on the UE information (e.g., first UE information) and monitoring, based on the instruction, the first bandwidth part or the second bandwidth part in connection with a communication of the UE (e.g., a first communication), the UE may further transmit second UE information, associated with a second communication of the UE, to permit the base station to select the first bandwidth part or the second bandwidth part. The UE may additionally receive a second instruction to monitor the first bandwidth part or the second bandwidth part, where the second instruction is selected based on the second user equipment information and is different from the first instruction, and monitoring, based on the second instruction, the first bandwidth part or the second bandwidth part in connection with the second communication of the user equipment. In this way, the UE may monitor the first bandwidth part or the second bandwidth part in response to changes in the operational needs of the UE that are reported by the UE, resulting in an efficient use of network resources and UE resources.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    transmitting, by a user equipment, user equipment information associated with a plurality of communications of the user equipment, to permit a base station to select a first bandwidth part or a second bandwidth part,
        wherein the user equipment information includes first information associated with a first communication, of the plurality of communications, associated with a data burst, and second information associated with a second communication, of the plurality of communications, associated with an idle period,
        wherein the user equipment information includes one or more transition conditions that provide a criterion for use in anticipating a change in operational needs of the user equipment, and
        wherein the one or more transition conditions include a transition condition that defines a transition from the first communication to the second communication;
    receiving, by the user equipment and based on whether the one or more transition conditions are satisfied, an instruction to monitor the first bandwidth part or the second bandwidth part,
        wherein the instruction is selected based on the user equipment information; and
    monitoring, by the user equipment and based on the instruction, the first bandwidth part or the second bandwidth part.

2. The method of claim 1, wherein the user equipment information includes a time period for the base station to select the first bandwidth part or the second bandwidth part.

3. The method of claim 1, further comprising:
    determining, by the user equipment and based on characteristics associated with a data transfer, the user equipment information,
        wherein the characteristics associated with the data transfer are obtained from:
            a modem of the user equipment, or a codec associated with an application of the user equipment.

4. The method of claim 1, wherein the first bandwidth part is associated with a first network slice instance of a network and the second bandwidth part is related to a second network slice instance of the network.

5. The method of claim 1, wherein the one or more transition conditions include an expiration of a time interval associated with a communication.

6. The method of claim 1, wherein the user equipment information is associated with at least one of:
   an operation of the user equipment,
   a communication of the user equipment,
   an application of the user equipment, or
   a setting of the user equipment.

7. The method of claim 1, wherein the user equipment information includes information associated with a pattern of at least one of:
   application information related to the user equipment,
   power consumption information relating to the user equipment, or
   bandwidth information relating to a traffic flow associated with the user equipment.

8. A non-transitory computer-readable medium storing instructions, the instructions comprising:
   one or more instructions that, when executed by one or more processors, cause the one or more processors to:
      transmit user equipment information associated with a plurality of communications of a user equipment, to permit a base station to select a first bandwidth part or a second bandwidth part for the user equipment,
         wherein the user equipment information includes first information associated with a first communication, of the plurality of communications, associated with a data burst, and second information associated with a second communication, of the plurality of communications, associated with an idle period,
         wherein the user equipment information includes one or more transition conditions that provide a criterion for anticipating a change in operational needs of the user equipment, and
         wherein the one or more transition conditions include a transition condition that defines a transition from the first communication to the second communication;
      receive, based on whether the one or more transition conditions are satisfied, an indication to monitor the first bandwidth part or the second bandwidth part,
         wherein the indication is selected based on the user equipment information; and
      monitor, based on the indication, the first bandwidth part or the second bandwidth part.

9. The non-transitory computer-readable medium of claim 8, wherein the user equipment information includes a time period for the base station to select the first bandwidth part or the second bandwidth part.

10. The non-transitory computer-readable medium of claim 8, wherein the user equipment information is transmitted via radio resource control (RRC) signaling or via a media access control (MAC) control element.

11. The non-transitory computer-readable medium of claim 8, wherein the one or more instructions that, when executed by one or more processors, cause the one or more processors to:
   determine, based on characteristics associated with a data transfer, the user equipment information,
      wherein the characteristics associated with the data transfer are obtained from:
         a modem of the user equipment, or
         a codec associated with an application of the user equipment.

12. The non-transitory computer-readable medium of claim 8, wherein the first bandwidth part is associated with a first network slice instance of a network and the second bandwidth part is related to a second network slice instance of the network.

13. The non-transitory computer-readable medium of claim 8, wherein the user equipment information includes information associated with a pattern of at least one of:
   application information related to the user equipment,
   power consumption information relating to the user equipment, or
   bandwidth information relating to a traffic flow associated with the user equipment.

14. A device comprising:
   one or more processors configured to:
      transmit user equipment information associated with a plurality of communications of a user equipment, to permit a base station to select a first bandwidth part or a second bandwidth part for the user equipment,
         wherein the user equipment information includes first information associated with a first communication, of the plurality of communications, associated with a data burst, and second information associated with a second communication of the plurality of communications, associated with an idle period,
         wherein the user equipment information includes one or more transition conditions that provide a criterion for anticipating a change in operational needs of the user equipment, and
         wherein the one or more transition conditions include a transition condition that defines a transition from the first communication to the second communication;
      receive, based on whether the one or more transition conditions are satisfied, an instruction to monitor the first bandwidth part or the second bandwidth part,
         wherein the instruction is selected based on the user equipment information; and
      monitor, based on the instruction, the first bandwidth part or the second bandwidth part.

15. The device of claim 14, wherein the user equipment information includes a time period for the base station to select the first bandwidth part or the second bandwidth part.

16. The device of claim 14, wherein the user equipment information is transmitted via radio resource control (RRC) signaling or via a media access control (MAC) control element.

17. The device of claim 14, wherein the one or more processors are configured to:
   determine, based on characteristics associated with a data transfer, the user equipment information,
      wherein the characteristics associated with the data transfer are obtained from:
         a modem of the user equipment, or
         a codec associated with an application of the user equipment.

18. The device of claim 14, wherein the first bandwidth part is associated with a first network slice instance of a network and the second bandwidth part is related to a second network slice instance of the network.

19. The device of claim 14, wherein the first information includes at least one of:
   application information relating to an application executing on the user equipment,
   power information relating to a power consumption of the user equipment, or
   bandwidth information relating to a traffic flow associated with the user equipment.

20. The device of claim 14, wherein the user equipment information includes information associated with a pattern of at least one of:
   application information related to the user equipment,
   power consumption information relating to the user equipment, or
   bandwidth information relating to a traffic flow associated with the user equipment.

* * * * *